April 18, 1944.    C. A. PERSONS    2,347,061
RESILIENT CYCLE SADDLE
Filed March 22, 1940    2 Sheets-Sheet 2

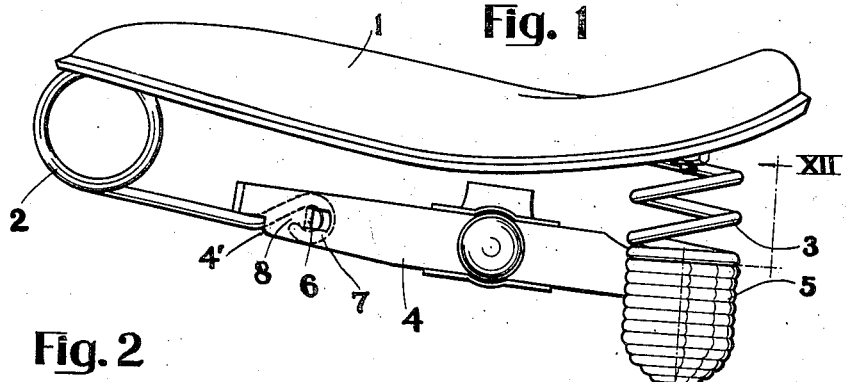
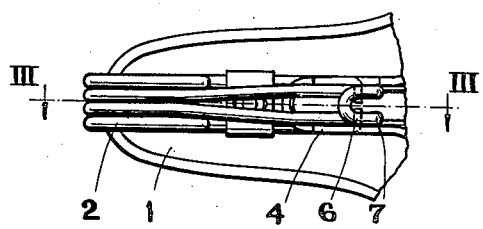
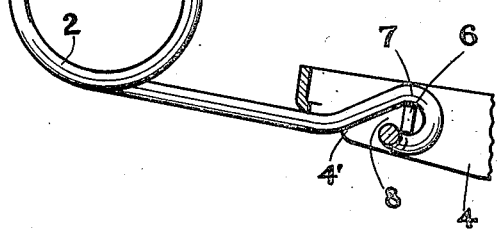
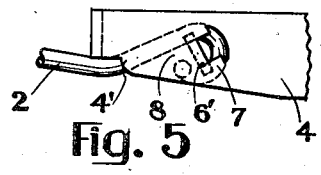
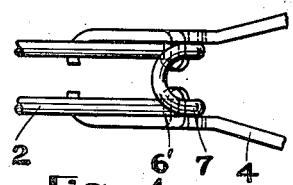
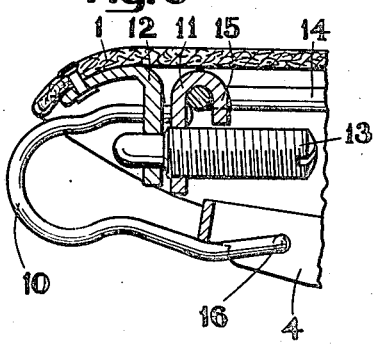
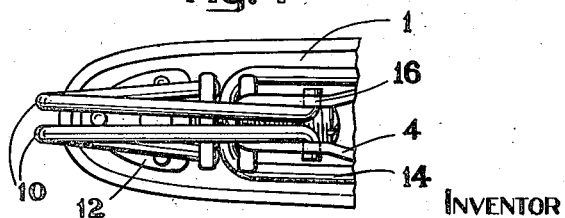

INVENTOR
Charles A. Persons
by Charles R. Fay
ATTY.

Patented Apr. 18, 1944

2,347,061

UNITED STATES PATENT OFFICE 2,347,061

RESILIENT CYCLE SADDLE

Charles A. Persons, Worcester, Mass., assignor to Persons - Majestic Manufacturing Company, Worcester, Mass., a corporation of Massachusetts Application March 22, 1940, Serial No. 325,415

12 Claims. (Cl. 155—5.22)

This invention relates to saddles for cycles and similar vehicles and particularly to saddles combining light weight with high resilience.

With public interest increasingly favoring "light weight" bicycles, the elimination of all unessential weight from every part of the bicycle is required. In a cycle saddle a reduction of weight should be obtained in such a manner that durability, appearance, and extreme comfort are fully maintained.

A saddle of the so-called "suspension" type is one in which heavy leather is molded to the desired form. The rear, wide end is riveted to a metal frame, called a cantle, and the front, narrow end is riveted to a formed metal bracket commonly called a pommel. A tension spring, to keep the leather seat taut, is interposed between the front and rear and is fastened to the cantle through eyes, formed in the spring, which are placed on bolts set in the cantle and extending downwardly therefrom.

Another type of saddle in wide use is known as the "motobike." The seat of this saddle is anatomically formed of thin metal on the top of which is soft padding covered with formed thin leather or fabric. In this "motobike" type of padded saddle the steel plate makes unnecessary the separate cantle, tension spring and pommel described as essential in saddles of the "suspension" type.

A commonly accepted method of springing a saddle top comprises springs at front and rear connected to a longitudinal supporting frame which includes means for attaching same to the seat-post of the cycle.

It is an object of this invention to provide a cycle saddle which is light in weight and yet fully as comfortable and durable as previous comparable but heavier models.

Another object is to provide in such a saddle, a construction in which the appearance of the rear springs is but very slightly modified so that the use of a simple spring in place of the so-called "compound" will not be apparent, but will still provide the desired resiliency.

A further object is to provide a simplified connection between the front spring and the frame in which the spring is pivotally connected to the frame without the use of auxiliary parts, and in which defects of the prior art devices are overcome.

Other objects and advantages of the invention will appear hereinafter.

Reference is to be had to the accompanying drawings, in which

Fig. 1 is a side view of a cycle saddle incorporating my invention;

Fig. 2 illustrates my improved frame and one form of spring connection in a bottom view of the forward portion of the saddle;

Fig. 3 is an enlarged sectional view taken on line III—III of Fig. 2;

Fig. 4 is a view similar to Fig. 2 which incorporates a modified form of my invention;

Fig. 5 is a side elevation of the parts shown in Fig. 4;

Fig. 6 is a sectional view showing the pommel construction of a suspension saddle and showing a modified form of the invention;

Fig. 7 is a bottom view of the construction shown in Fig. 6;

Figure 10:
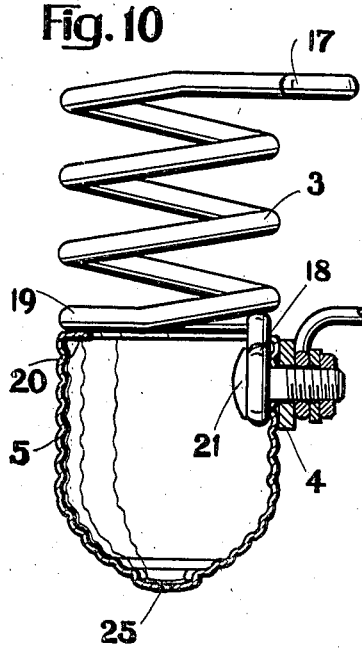
Fig. 10 is a view taken on line XII—XII of Fig. 1 and which shows the construction of the rear spring and pendant.

The saddle top 1, which may be of any suitable construction and materials, is mounted on a spring set which consists of a front spring 2, which is usually a nose coil, a pair of coil compression springs 3 suspended from the rear of the saddle top 1, and a suitable frame or longitudinal truss 4 which extends from the front spring 2 to the rear springs 3 and is attached to these springs by bolts, as shown in Fig. 10, the lowermost portion of the coil compression springs 3 entering in and being secured to cup-shaped pendants 5 which depend from the frame 4 directly below said compression springs 3.

The forward end of the frame 4 is hingedly connected to the front spring 2. At its extreme forward portion the frame 4 comprises a continuous strip bent in a generally U shape with its underside partially cut away as at 4', and with a rectangular tongue 6 formed in each side thereof and turned inwardly.

The lower end of the front spring extends rearwardly and is formed at its extremity with a hook or eye 7. The opening 8 of said hook 7 is of a suitable size to pass the tongue 6 in the small dimension of the latter and to be retained thereby when in its assembled relation. Thus the frame 4 is assembled to the front spring 2 by passing the small dimension of the tongue 6 through the opening 8 in the hook 7 and then pivoting the frame 4 about said tongue 6 until the lower rearwardly extending portion of the front spring 2 rests in the cut away portion 4' of the forward end of the frame 4.

In this assembled relation, the front spring 2 is free to hinge downwardly about the tongue 6, but its upward movement is checked by contact with the U-shaped portion at the forward end of the cut-out frame portion 4', and the opening 8 in the hook 7 is at such an angle to the small dimension of the tongue 6 that the parts cannot become disassembled in riding.

Figure 8:
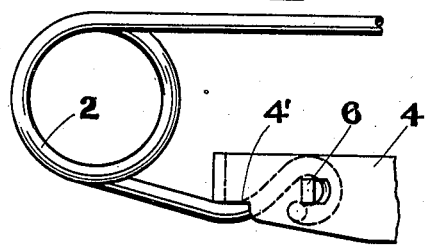
Figs. 8 and 9 illustrate the resilient action of the nose coil assembly of the present invention.
Figure 9:
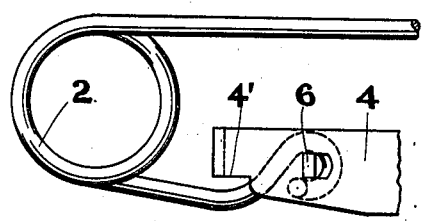

Turning to Figs. 8 and 9, it will be seen from a comparison of these figures how the resilience of the pommel is obtained. Fig. 8 shows the condition of the spring 2 when unweighted, the tension of the spring causing it to abut the truss 4 at the cut away portion 4'. When the pommel receives a shock load, the hooked end of the spring is pivoted about the tongue 6, but this end of the spring does not bend. All the give is in the coil 2, which easily reassumes normal position when the load is removed, because its limit of deformation cannot be reached even in extremely rough riding or accident.

In the arrangement shown in Figs. 6 and 7, the pommel portion of a suspension saddle is supported by a pair of torsion springs 10 which act as and in effect are a single spring; the lower ends of these springs being hingedly connected to the forward portion of the frame 4. The upper ends of the springs 10 are riveted to or otherwise secured in the vertical part of a tension plate 11. A pommel bracket 12, curved to conform to the pommel portion of the seat 1 and riveted thereto, constitutes the immediate support for this part of the seat, this member being provided with a vertical arm which is secured by a tension screw 13 to the tension plate 11.

A U-shaped tension spring 14 lies just under the seat 1. The apex of this spring lies adjacent the ends of the front spring 10 and the tension plate 11 has a hooked portion 15 extending over the spring 14. The function and form of the tension plate 11 is commonly known, having been particularly disclosed in my Patent No. 1,174,177. Its operation is such that the saddle will yield downwardly but its rebound will be limited by the peculiar connection between the upper end of the front spring 10 and tension spring 14, the latter and the tension plate 11 cooperating to effect this result.

The connection between the frame 4 and the front spring 10 (Fig. 6) is similar in function to that shown in Fig. 3, and adds to the resiliency of this front spring by providing a freely hinging connection at this point. However, the lower ends of the front spring 10 are turned outwardly and pass through holes in the frame as at 16. The ends of this spring are then secured in any suitable manner such as by being headed over on the outside of the frame 4.

The vertical coil and eye construction, as shown in Fig. 3, may be used in this suspension type saddle by riveting the upper ends of the coil spring 2 (Fig. 3) to the tension plate 11 (Fig. 6) and cutting and bending headed tongues 6 in the frame 4, as shown in Figs. 4 and 5. In this case, the assembly is similar to that shown in Figs. 2 and 3, but the heads on the tongues 6' are used to retain the eye 7 in place. The tongues 6' are rectangular and have the same function as tongues 6.

The rear springs 3, 3' are open wound coil springs. In the embodiment shown in Fig. 10, the spring 3 is eyed at 17 and 18 at both ends with the lower end coil bent into a horizontal loop 19 which lies on a strengthening flange 20 on the pendant 5. The spring eye 18 extends downwardly into the cup-shaped pendant 5. A bolt 21 passes through the lower eye 18 of the spring 3 and the wall of the pendant 5 and secures them to the frame 4. At the upper end of this spring 3, the wire is left straight and an eye 17 is formed outside of the circumference of the spring. This construction greatly facilitates assembly, because it positions the securing bolt (not shown) where it can be more easily reached than in the center of the spring 3' as shown at 22 in Fig. 11.

Figure 11:
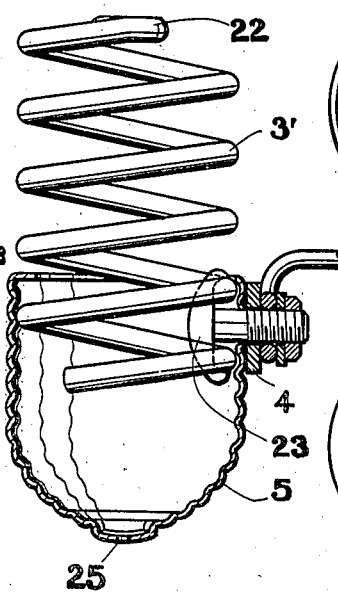
Fig. 11 is a view similar to Fig. 10 of a modified construction of the rear spring and pendant.
Figure 12:
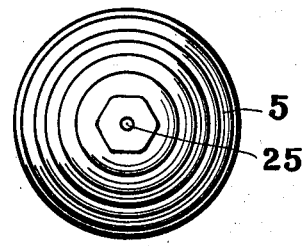
Fig. 12 is a bottom view of the rear spring and pendant.
Figure 13:
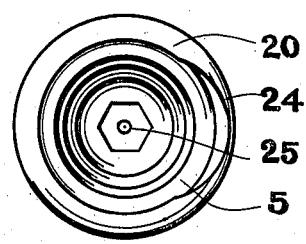
Fig. 13 is a top view of the pendant.

Another type of coil compression spring 3' is shown in Fig. 11. The lowermost coils of this spring 3' extend into and are contained in the pendant 5. A headed bolt 23 grips two coils of the spring 3' simultaneously and passes through the wall of the pendant 5 and the frame 4 to secure the parts together.

The riding qualities of cycle saddles made in accordance with my invention are equal to those having a pair of rear springs of the type commonly called "compound" springs, because by selecting a suitable pitch and size of wire the tension of the single compression spring may be made equal to that of the so-called "compound" spring.

The pendants 5 may be of any shape and configuration, as their function is to receive the lower ends of the rear spring 3 or 3' to eliminate the rough or unfinished appearance which would otherwise exist at that point in this "lightweight" saddle assembly and to prevent any possible injury to the rider due to the rough ends of the spring. However, I prefer to form rings substantially equal in width to the diameter of the spring wire, about the walls of the pendants to approximate the conventional appearance of extension springs. A portion of the rim 20 is cut away at 24 to allow the spring 3 to enter the pendant 5, and a small hole 25 is provided at the lowermost point of the pendant 5 to prevent the accumulation of water therein.

Having thus described my invention and the advantages thereof, I do not wish to be limited to the details herein disclosed, otherwise than as set forth in the claims, but what I claim is:

1. A saddle of the class described comprising a saddle seat, a supporting frame, means for resiliently connecting the front of the seat with the supporting frame, a pair of downwardly extending resilient members attached to the underside of the rear of the seat, a pair of circumferentially corrugated cup-shaped pendants containing the lower ends of said pair of resilient members and secured thereto said resilient members comprising coil springs, and the inner diameter of said pendants being substantially equal to the outside diameter of each coil spring.

2. In a saddle, a saddle top, a longitudinal supporting frame connected at its forward end to said saddle top, compression springs depending from the saddle top at the outer side of said frame, a pair of circumferentially corrugated pendants depending from said frame below said springs, and a connection extending thru each pendant and securing said spring, pendant, and frame together, said corrugations being of a width substantially equal to the diameter of a run of said springs.

3. In a saddle of the class described, a frame, a saddle top, coil compression springs interposed between said top and said frame, means for engaging the coils of each of said compression springs on one side thereof to secure the same to said frame, and interiorly and exteriorly corrugated pendants containing and enclosing the lower ends of said springs and secured to said frame by said means, said pendants having open tops and substantially closed bottoms, said springs directly entering said pendants thru said open tops and certain of the coils thereof being located in certain of the pendant corrugations.

4. In a saddle of the class described, a frame, a saddle top, resilient supporting means for said top comprising a coil spring, a corrugated pendant containing the lower end of said spring, and means for engaging more than one coil of said spring on one side thereof and intermediate its ends to bind the same to said frame, said engaged coils entering and located in certain of said corrugations.

5. In a saddle of the class described, a frame, a saddle top, resilient supporting means for said top comprising coil compression springs interposed between said top and said frame, corrugated pendants corrugated throughout their lengths and containing and enclosing the lower ends of said springs, means coacting with the frame for securing each of said springs and said pendants to said frame, and comprising a bolt provided with a binding head shaped to and engaging more than one coil of the spring, said engaged coils entering and being located in certain of said corrugations.

6. In a saddle of the class described, a frame, a saddle top, a coil compression spring interposed between said top and said frame and having its uppermost convolution secured to said top and its lowermost convolution formed with an eye, a flanged pendant containing said eye, said lowermost convolution resting on the flange, and means coacting with said eye to secure said spring and pendant to said frame, said means passing directly thru the walls of said pendant.

7. In a device of the class described, a saddle seat, a supporting frame, means resiliently connecting said seat to said frame, said means comprising a spring having an eye, a lug on said frame located within said eye, and stop means on said frame for limiting the upward movement of said spring, which is free to move bodily downwardly under pressure exerted on said seat.

8. In a device of the class described, a saddle seat, a supporting frame therefor, a lug on said frame, a spring attached to said seat and having a free end, an eye on said free end, said eye accommodating said lug, said frame having a recessed portion forward of said lug, said free end extending through said recess, a wall of said recess acting as a stop for upward movement of said free end of said spring, and said eye and lug providing a pivot for free downward movement of said spring.

9. In a device of the class described, as recited in claim 8, in which said lug is rectangular and said eye has an opening of a width corresponding to the short dimension of said rectangular lug, said eye being of a diameter corresponding to the long dimension of said lug, whereby said eye may be slipped over said lug, and normal pivoting of the eye on the lug will fail to disengage the parts.

10. In a device of the class described, a saddle seat, a supporting frame, an inwardly directed tongue near one end of said frame and a pair of cup-shaped pendants secured to the other end thereof, springs interposed between said seat and said frame, one of said springs having an eye for engagement with said tongue to form a pivot, the lower ends of the other springs being contained in said pendants and secured thereto and to said frame.

11. A saddle of the class described comprising a saddle top, a supporting frame, and a pair of compression springs interposed between said top and frame, a cup-shaped pendant for each spring depending from said frame, each spring having a portion entering its pendant, means on each pendant engageable with a run of its spring effective to prevent tilting of said pendant relative to the spring, means securing said spring portion, pendant, and frame together, the pendant tilting preventing means comprising a flange on each pendant against which the lowermost convolution of a spring may rest.

12. A saddle of the class described including a saddle top, a supporting frame therefor connected at its forward end to the saddle top, compression springs formed with eyes at their lower ends and depending from the rear of the saddle top, fasteners extending through the eyes and connecting said springs at their lower ends to said frame, a pair of open-top, cup-shaped pendants which are mounted upon and depend from said frame directly below said springs, said eyes each being located adjacent a wall of a pendant and being secured thereto and to said frame, said pendants extending well below the lower ends of said springs.

CHARLES A. PERSONS.